| United States Patent [19] | [11] Patent Number: 4,845,177 |
|---|---|
| Vogt et al. | [45] Date of Patent: Jul. 4, 1989 |

[54] PREPARATION OF HOMOPOLYMERS AND COPOLYMERS OF ETHYLENE BY MEANS OF A ZIEGLER CATALYST SYSTEM

[75] Inventors: Heinz Vogt, Ludwigshafen; Eckard Schauss, Heuchelheim; Guenther Schweier, Friedelsheim, all of Fed. Rep. of Germany

[73] Assignee: BASF Aktiengesellschaft, Ludwigshafen, Fed. Rep. of Germany

[21] Appl. No.: 107,996

[22] Filed: Oct. 14, 1987

[30] Foreign Application Priority Data

Oct. 14, 1986 [DE] Fed. Rep. of Germany ....... 3634915

[51] Int. Cl.$^4$ .......................... C08F 4/64; C08F 10/02
[52] U.S. Cl. ..................... 526/125; 502/126; 526/348.6; 526/901; 526/904
[58] Field of Search ......................................... 526/125

[56] References Cited

U.S. PATENT DOCUMENTS

| 4,521,573 | 6/1985 | Lee et al. | 526/901 |
| 4,605,714 | 8/1986 | Baker | 526/125 |
| 4,713,430 | 12/1987 | Kerth et al. | 526/159 |

FOREIGN PATENT DOCUMENTS

| 0174620 | 3/1986 | European Pat. Off. | |
| 3433468 | 3/1986 | Fed. Rep. of Germany | 526/125 |
| 1601418 | 10/1981 | United Kingdom . | |

*Primary Examiner*—Edward J. Smith
*Attorney, Agent, or Firm*—Keil & Weinkauf

[57] ABSTRACT

Ethylene is polymerized using a Ziegler catalyst system consisting of (1) a titanium catalyst component and (2) an aluminum catalyst component, the component (1) used being the product (VI) which is obtained by a method in which (1.1) first (1.1.1) a carrier (I) and (1.1.2) a solution (II) of (IIa) a solvent, (IIb) a titanium trichloride and (IIc) magnesium chloride are combined with formation of a dispersion (III) and the latter is evaporated down with formation of an intermediate (IV), and (1.2) then (1.2.2) the intermediate (IV) obtained from (1.1), and (1.2.2) an aluminum component (V) consisting of (1.2.2.1) a complex of a certain oxacycloalkane and a certain aluminum compound and (1.2.2.2) if necessary, a certain free aluminum compound are combined, the resulting product (VI) being the catalyst component (1). In this process, a component (1) is employed which has been prepared using, in (1.1) under (1.1.2), a solution (II) which (i) contains a ketone as (IIa) and (ii) additionally contains (IId) a certain low molecular weight polymeric compound.

1 Claim, No Drawings

PREPARATION OF HOMOPOLYMERS AND COPOLYMERS OF ETHYLENE BY MEANS OF A ZIEGLER CATALYST SYSTEM

The present invention relates to a process for the preparation of homopolymers of ethylene and, in particular, copolymers of ethylene with minor amounts of $C_3$–$C_8$-alpha-monoolefins, in particular $C_4$–$C_6$-alpha-monoolefins, by polymerization of the monomer or monomers at from 30° to 200° C. in particular from 50° to 100° C. and under from 1 to 200, in particular from 5 to 60, bar, by means of a Ziegler catalyst system consisting of (1) a titanium-containing catalyst component and (2) an aluminum-containing catalyst component of the formule $AlR_3$, where R is a $C_1$–$C_{12}$-hydrocarbon radical, preferably $C_1$–$C_{12}$-alkyl, in particular $C_2$–$C_8$-alkyl, with the provisos that (i) the atomic ratio of titanium in the catalyst component (1) to aluminum from the catalyst component (2) is from 1:5 to 1:700, in particular from 1:10 to 1:500, and (ii) the titanium-containing catalyst component (1) employed is the solid-phase product (VI) which is obtained when (1.1) First (1.1.1) a finely divided, porous, inorganic oxide substance (I) which has a particle diameter of from 1 to 1000 μm, in particular from 10 to 400 μm, a pore volume of from 0.3 to 3, in particular from 1 to 2.5, cm³/g and a surface area of from 100 to 1000, in particular from 200 to 400, m²/g and is of the formula $SiO_2.aAl_2O_3$, where a is from 0 to 2, in particular from 0 to 0.5, and (1.1.2) a solution (II) as obtained by combining (IIa) 100 parts by weight of an organic oxygen-containing solvent, (IIb) from 0.01 to 6, in particular from 0.04 to 3.5, parts by weight (calculated as titanium) of a titanium trichloride of the formula $TiCl_3.nAlCl_3$, where n is from 0 to 0.5, preferably from 0.2 to 0.4, in particular from 0.31 to 0.35, and (IIc) from 0.01 to 4, in particular from 0.04 to 2.5, parts by weight (calculated as magnesium) of magnesium chloride ($MgCl_2$), are brought into contact with one another with formation of a dispersion (III), with the proviso that the weight ratio of inorganic oxide substance (I) to titanium in the titanium trichloride (IIb) is from 1:0.01 to 1:0.2 and the weight ratio of inorganic oxide substance (I) to magnesium in the magnesium chloride (IIc) is from 1:0.01 to 1:0.25, the dispersion (III) is evaporated to dryness at below 200° C., in particular below 160° C., and above the melting point of the organic oxygen-containing solvent (IIa) used, with formation of a solid-phase intermediate (IV), and (1.2) Then (1.2.1) the solid-phase intermediate (IV) obtained from stage (1.1) and (1.2.2) an aluminum component (V) which is dissolved in an inert hydrocarbon and consists of (1.2.2.1) from 25 to 100, preferably from 35 to 100, in particular from 50 to 100, mol % of a complex which is soluble in the inert hydrocarbon and is of the empirical formula

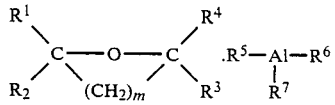

where m is 2, 3 or 4, in particular 2, $R^1$, $R^2$, $R^3$ and $R^4$ are each $C_1$–$C_3$-alkyl or hydrogen, preferably methyl or hydrogen, in particular hydrogen, $R^5$ and $R^6$ are each a $C_1$–$C_{12}$-hydrocarbon radical, preferably $C_1$–$C_{12}$-alkyl, in particular $C_2$–$C_8$-alkyl, and $R^7$ is a $C_1$–$C_{12}$-hydrocarbon radical or chlorine, preferably $C_1$–$C_{12}$- alkyl or chlorine, in particular $C_2$–$C_8$-alkyl or chlorine, and (1.2.2.2) from 0 to 75, preferably from 0 to 65, in particular from 0 to 50, mol % of an aluminum compound which is soluble in the inert hydrocarbon and is of the formula

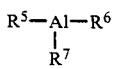

where $R^5$ and $R^6$ are each a $C_1$–$C_{12}$-hydrocarbon radical, preferably $C_1$–$C_{12}$-alkyl, in particular $C_2$–$C_8$-alkyl, and $R^7$ is a $C_1$–$C_{12}$-hydrocarbon radical or chlorine, preferably $C_1$–$C_{12}$-alkyl or chlorine, in particular $C_2$–$C_8$-alkyl or chlorine, are brought into contact with one another with formation of a dispersion, with the provisos that (i) the sum of the molar percentages under (1.2.2.1) and (1.2.2.2) is 100 and (ii) the atomic ratio of titanium in the solid-phase intermediate (IV) to aluminum in the aluminum component (V) is from 1:1 to 1:50, in particular from 1:10 to 1:40, the resulting dispersed solid-phase product (VI) being the titanium-containing catalyst component (1).

Polymerization processes of this type are known, and those described in British Pat. No. 1,601,418 and, in particular, European Laid-Open Application No. 0,174,620 may be regarded as typical in the present context.

Like other comparable procedures, the stated procedure has, as its centerpiece, a special embodiment of a titanium-containing catalyst component (1).

The known catalyst components (1) of the relevant procedure permit the preparation of polymers which have small polymer fractions which are soluble in n-heptane or xylene, with the result that, for example, the adhesive tendency of films of these polymers can be suppressed. However, the morphological properties of the polymers are disadvantageous, particularly with regard to technical control of the gas-phase process in the fluidized bed, for example the large amount of very fine particles obtained in the polymerization, which leads to blockages of the circulating gas systems, necessitates separation apparatuses, such as cyclones or filters; another considerable disadvantage is the low bulk density of the polymer and the change in the particle size, the particle size distribution and/or the particle shape with variation of the polymer density and/or of the melt flow index of the polymer.

It is an object of the present invention to provide a novel type of titanium-containing catalyst component (1) which has the stated disadvantages to a considerably reduced extent, if not all.

We have found that this object is achieved if, in the polymerization process defined at the outset, a Ziegler catalyst system is employed whose titanium-containing catlyast component (1) is one which has been prepared using, in stage (1.1) under (1.1.2), a solution (II) which (IIa) contains a ketone as the organic oxygen-containing solvent and additionally contains (IId) a low molecular weight polymeric compound of a specific type.

The present invention accordingly relates to a process for the preparation of homopolymers of ethylene and in particular copolymers of ethylene with minor amounts of $C_3$-$C_8$-alpha-monoolefins, in particular $C_4$-$C_6$-alpha-monoolefins, by polymerization of the monomer or monomers at from 30° to 200° C. in particular from 50° to 100° C. and under from 1 to 200, in particular from 5 to 60, bar by means of a Ziegler catalyst system consisting of (1) a titanium-containing catalyst component and (2) an aluminum-containing catalyst component of the formula $$AlR_3,$$

where R is a $C_1$-$C_{12}$-hydrocarbon radical, preferably $C_1$-$C_{12}$-alkyl, in particular $C_2$-$C_8$-alkyl, with the provisos that (i) the atomic ratio of titanium in the catalyst component (1) to aluminum from the catalyst component (2) is from 1:5 to 1:700, in particular from 1:10 to 1:500, and (ii) the titanium-containing catalyst component (1) employed is the solid-phase product (VI) which is obtained when (1.1) First (1.1.1) a finely divided, porous, inorganic oxide substance (I) which has a particle diameter of from 1 to 1000 μm, in particular from 10 to 400 μm, a pore volume of from 0.3 to 3, in particular from 1 to 2.5, cm$^3$/g and a surface area of from 100 to 1000, in particular from 200 to 400, m$^2$/g and is of the formula $SiO_2 \cdot aAl_2O_3$, where a is from 0 to 2, in particular from 0 to 0.5, and (1.1.2) a solution (II) as obtained by combining (IIa) 100 parts by weight of an organic oxygen-containing solvent, (IIb) from 0.01 to 6, in particular from 0.04 to 3.5, parts by weight (calculated as titanium) of a titanium trichloride of the formula $TiCl_3 \cdot nAlCl_3$, where n is from 0 to 0.5, preferably from 0.2 to 0.4, in particular from 0.31 to 0.356, and (IIc) from 0.01 to 4, in particular from 0.04 to 2.5, parts by weight (calculated as magnesium) of magnesium chloride ($MgCl_2$), are brought into contact with one another with formation of a dispersion (III), with the proviso that the weight ratio of inorganic oxide substance (I) to titanium in the titanium trichloride (IIb) is from 1:0.01 to 1:0.2 and the weight ratio of inorganic oxide substance (I) to magnesium in the magnesium chloride (IIc) is from 1:0.01 to 1:0.25, the dispersion (III) is evaporated to dryness at below 200° C., in particular below 160° C., and above the melting point of the inorganic oxygen-containing solvent (IIa) used, with formation of a solid-phase intermediate (IV), and (1.2) Then (1.2.1) the solid-phase intermediate (IV) obtained from stage (1.1) and (1.2.2) an aluminum component (V) which is dissolved in an inert hydrocarbon and consists of (1.2.2.1) from 25 to 100, preferably from 35 to 100, in particular from 50 to 100, mol % of a complex which is soluble in the inert hydrocarbon and is of the empirical formula

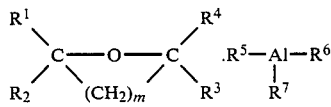

where m is 2, 3 or 4, in particular 2, $R^1$, $R^2$, $R^3$ and $R^4$ are each $C_1$-$C_3$-alkyl or hydrogen, preferably methyl or hydrogen, in particular hydrogen, $R^5$ and $R^6$ are each a $C_1$-$C_{12}$-hydrocarbon radical, preferably $C_1$-$C_{12}$-alkyl, in particular $C_2$-$C_8$-alkyl, and $R^7$ is a $C_1$-$C_{12}$-hydrocarbon radical or chlorine, preferably $C_1$-$C_{12}$-alkyl or chlorine, in particular $C_2$-$C_8$-alkyl or chlorine, and (1.2.2.2) from 0 to 75, perferably from 0 to 65, in particular from 0 to 50, mol % of an aluminum compound which is soluble in the inert hydrocarbon and is of the formula

where $R^5$ and $R^6$ are each a $C_1$-$C_{12}$-hydrocarbon radical, preferably $C_1$-$C_{12}$-alkyl, in particular $C_2$-$C_8$-alkyl and $R^7$ is a $C_1$-$C_{12}$-hydrocarbon radical or chlorine, preferably $C_1$-$C_{12}$-alkyl or chlorine, in particular $C_2$-$C_8$-alkyl or chlorine, are brought into contact with one another with formation of a dispersion, with the provisos that (i) the sum of the molar percentages under (1.2.2.1) and (1.2.2.2) is 100 and (ii) the atomic ratio of titanium in the solidphase intermediate (IV) to aluminum in the aluminum component (V) is from 1:1 to 1:50, in particular from 1:10 to 1:40, the resulting dispersed solid-phase product (VI) being the titanium-containing catalyst component (1).

In the novel process, the titanium-containing catalyst component (1) employed is prepared using, in stage (1.1) under (1.1.2), a solution (II) which contains (IIa) a ketone of the formula $$R^8-CO-R^9$$

where $R^8$ and $R^9$ are each a saturated $C_1$-$C_8$-hydrocarbon radical, preferably a saturated $C_1$-$C_6$-hydrocarbon radical, in particular $C_1$-$C_4$-alkyl, as the organic oxygen-containing solvent, and additionally contains (IId) from 0.01 to 10, in particular from 0.1 to 5, parts by weight of a low molecular weight polymeric compound which has a viscosity of from $10^{-3}$ to $10^3$, in particular from 1 to $10^2$, Pas and has repeating structural units

where $R^{10}$ and $R^{11}$ are each hydrogen or a saturated $C_1$-$C_8$-hydrocarbon radical, preferably hydrogen or a saturated $C_1$-$C_6$-hydrocarbon radical, in particular hydrogen or $C_1$-$C_4$-alkyl, and X is oxygen or methylene, preferably methylene.

When the titanium-containing catalyst component (1) obtained according to the invention is used, the polymerization process as such can be carried out in virtually any relevant conventional technological embodiments, for example as a batchwise, periodic or, in particular, continuous suspension polymerization process or, in particular, dry phase polymerization process in a stirred or, in particular, fluidized bed. The stated technological embodiments, ie. the technological variants of the polymerization of olefins by the Ziegler method, are well known from the literature and in practice so that further description is unnecessary. All that need be noted is that, like corresponding known catalyst components, the novel titanium-containing catalyst component (1) can, for example, be combined with catalyst component (2) outside or inside the polymerization vessel, in the last-mentioned case, for example, by introducing the components at separate points. The components can be handled in the form of a suspension (catalyst component (1) or solution (catalyst component (2)).

Regarding the novel titanium-containing catalyst component (1) itself, the following may be stated:

It is prepared in two stages, which are designated above and below by (1.1) and (1.2).

In stage (1.1), a finely divided inorganic oxide substance (I) of the type defined above and a certain solution (II) defined above are brought into contact with one another to give a dispersion (III), which is evaporated to dryness with the formation of a solid-phase intermediate (IV). In stage (1.2), the latter is brought into contact with a solution of a certain aluminum component (V) defined above, with formation of a further dispersion, the dispersed solid-phase product (VI) which results being the novel catalyst component (1).

Specifically, the process can be carried out as follows:

Stage (1.1)

The inorganic oxide substance (I) is combined, as such or dispersed in a ketone (advantageously a ketone as defined under (IIa), the dispersion having a solids content of not less than 5% by weight), with the solution (II). After the combination, it is advantageous to keep the entire mixture at from 10° to 160° C., in particular from 20° to 120° C., for from 5 to 120, in particular from 20 to 90, minutes and only thereafter to evaporate down the resulting dispersion (III).

The solution (II) itself can be prepared in the manner usually employed for the preparation of solutions and in this respect the preparation has no special features. It has proven advantageous to prepare solution (II) by combining a solution of the ketone (IIa) and the titanium trihalide (IIb) with a solution of the ketone (IIa) and the magnesium chloride (IIc) and a solution of the ketone (IIa) and the low molecular weight polymeric compound (IId). In a particularly advantageous procedure for the preparation of the solution (II), (IIb), (IIc) and (IId) are dissolved together in the ketone (IIa).

As a final measure in stage (1.1), the dispersion (II) is evaporated to dryness, the solid-phase intermediate (IV) being obtained. This procedure can be carried out in the manner usually employed for evaporating down dispersions under mild conditions, the abovementioned temperatures being maintained. This means that it is generally advantageous to evaporate down the dispersion under pressure which is reduced by a greater or lesser extent or in an inert gas stream, for example a stream on nitrogen or argon. As a rule of thumb, the pair of parameters temperature/pressure or amount and temperature of the gas stream should be chosen so that the temperature of the dispersion does not fall below 40° C. during the evaporation process. It is also advantageous to carry out the evaporation while constantly maintaining the homogeneity of the material treated; for example, rotary evaporators have proven useful for this purpose. A residual amount of ketone, for example an amount which is bonded as a result of complex formation, generally has no adverse effect on the resulting solid-phase intermediate (IV).

Stage (1.2) A 1–40, preferably about 30, % strength by weight suspension of the solid-phase intermediate (IV) and a 5–80, preferably about 35, % strength by weight solution of the aluminum component (V) are initially prepared as separate batches, inert hydrocarbons, especially relatively low boiling alkane hydrocarbons, such as hexanes, heptanes or gasolines, being used as the suspending agent or solvent. The suspension and the solution are then combined in proportions such that the desired weight ratio is obtained. Combination is generally effected by introducing the solution into the stirred suspension, since this procedure is more practical than the reverse one, which is also possible. At from 15° to 60° C., which advantageously should not be exceeded, in particular from 25° to 50° C., the formation of the solid-phase product (VI), which is obtained as a dispersion, is complete within from 60 to 600, in particular from 90 to 400, minutes.

This product can be used as the titanium-containing catalyst component (1) directly in the form of the resulting dispersion, advantageously after washing by digestion. However, it is generally more advantageous to isolate the solid-phase product (VI) before using it as catalyst component (1). Isolation may be carried out, for example, by the following method: the product (VI) is separated from the liquid phase by filtration and is washed with a pure liquid (for example a liquid of the type also used as a suspending agent or solvent), after which the product is dried, for example under reduced pressure.

If the aluminum component (V) to be used in stage (1.2) consists not only of (1.2.2.1) the soluble complex defined above

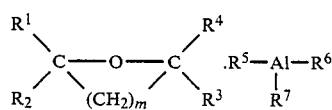

but also (1.2.2.2) of the soluble aluminum compound defined above

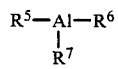

the intermediate (IV) obtained from stage (1.1) can be treated with a solution of the complex and the aluminum compound together or, in a generally more advantageous procedure, first with a solution of the complex and then with a solution of the aluminum compound, in succession.

The novel titanium-containing catalyst components (1), ie. the solid-phase products (VI), can be used in the polymerization process described at the outset for the preparation of the polymers stated there, in the manner in which the titanium-containing compounds are usually employed in the polymerization of olefins by the Ziegler method. In this respect, there are therefore no special features, and reference may be made to the methods of use which are well known from the literature and in practice. It should merely be stated that the novel catalyst components (1) are mainly suitable for the preparation of copolymers of ethylene, and that, in addition to propene and oct-1-ene, but-1-ene, hex-1-ene and 4-methylpent-1-ene are particularly suitable comonomers. The molecular weights of the polymers can be regulated in the relevant conventional manner, in particular using hydrogen as a regulator.

Regarding the composition of the novel titanium-containing catalyst components (1), the following may be stated specifically.

The inorganic oxide substance (I) to be used in stage (1.1) is in general an aluminum silicate or, in particular, a silica; it is important that the substance has the required properties and is very dry. Drying may be carried out physically, for example by heating under reduced pressure, or chemically, for example by treatment with an aluminumalkyl. Particularly suitable inorganic oxide substances are those obtained in the first stage (1) of the process described in British Pat. No. 1,550,951, in particular when the starting materials used are hydrogels obtained by the process described in British Pat. No. 1,368,711.

The ketones (IIa) to be used may be, for example, acetone, diethyl ketone, di-n-propyl ketone, di-n-butyl ketone, methyl ethyl ketone, methyl propyl ketone, methyl n-butyl ketone or n-butyl ethyl ketone. The ketones (IIa) can be used in the form of individual compounds or as a mixture of two or more individual compounds.

The titanium trichloride (IIb) to be used may be a compound conventionally employed in Ziegler catalyst systems, for example a reaction product obtained by the reduction of titanium tetrachloride with hydrogen, aluminum or an organoaluminum compound. Trichlorides of the formula $TiCl_3$, as obtained in the reduction of titanium tetrachloride with hydrogen, and trichlorides of the formula $TiCl_3.1/3\ AlCl_3$, as obtained in the reduction of titanium tetrachloride with metallic aluminum, have proven particularly suitable. The titanium trichlorides can be used in the form of individual compounds or mixtures of two or more individual compounds.

The magnesium compound (IIc) likewise to be used in the stage (1.1) is magnesium chloride ($MgCl_2$).

The low molecular weight polymeric compounds (IId) which, finally, are also to be used in stage (1.1) may be, for example, polyethylene wax, polybutene, polyisobutene, polyhexene, random polypropylene, polyvinyl ether, polystyrene or polytetrahydrofuran. The low molecular weight polymeric compounds (IId) can be used in the form of individual compounds or as mixtures of two or more individual compounds.

The aluminum component (V) to be used in stage (1.2) consists of (1.2.2.1) from 25 to 100, preferably from 35 to 100, in particular from 50 to 100, mol % of a complex which is soluble in the inert hydrocarbon and is of the empirical formula

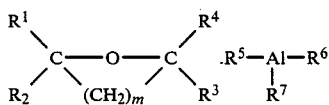

where m is 2, 3 or 4, in particular 2, $R^1$, $R^2$, $R^3$ and $R^4$ are each $C_1$–$C_3$-alkyl or hydrogen, preferably methyl or hydrogen, in particular hydrogen, $R^5$ and $R^6$ are each a $C_1$–$C_{12}$-hydrocarbon radical, preferably $C_1$–$C_{12}$-alkyl, in particular $C_2$–$C_8$-alkyl, and $R^7$ is a $C_1$–$C_{12}$-hydrocarbon radical or chlorine, preferably $C_1$–$C_{12}$-alkyl or chlorine, in particular $C_2$–$C_8$-alkyl or chlorine, and (1.2.2.2) from 0 to 75, preferably from 0 to 65, in particular from 0 to 50, mol % of an aluminum compound which is soluble in the inert hydrocarbon and is of the formula

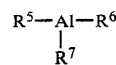

where $R^5$ and $R^6$ are each a $C_1$–$C_{12}$-hydrocarbon radical, preferably $C_1$–$C_{12}$-alkyl, in particular $C_2$–$C_8$-alkyl, and $R^7$ is a $C_1$–$C_{12}$- alkyl or chlorine, preferably $C_1$–$C_{12}$-alkyl or chlorine, in particular $C_2$–$C_8$-alkyl or chlorine, with the proviso that the sum of the percentages under (1.2.2.1) and (1.2.2.2) is 100.

In the case of the complexes under (1.2.2.1), the following components are suitable:

(i) for the oxacycloalkane moiety, especially tetrahydrofuran, as well as tetrahydropyran and oxepan, and 2-methyltetrahydrofuran, 2,5-dimethyltetrahydrofuran, 2,2,5,5-tetra-methyltetrahydrofuran, 2-methyltetrahydropyran and 2,6-dimethyltetrahydropyran.

The oxacycloalkanes may be in the form of individual compounds or mixtures of two or three individual compounds.

(iii) For the organoaluminum moiety, for example, especially diethylaluminum chloride as well as triethylaluminum, triisobutylaluminum, tri-n-hexylaluminum and tri-n-octylaluminum.

These components too may be in the form of individual compounds or mixtures of two or more individual compounds.

Regarding the aluminum compounds under (1.2.2.2), the same applies as stated above under (ii) with respect to the organoaluminum moiety of the complexes.

Complexes of this type are known; a suitable method for their preparation is described, for example, by E. B. Baker and H. H. Sisler in Am. Soc. 75 (1953), 4828.

Suitable aluminum-containing components (2) of the Ziegler catalyst system to be used according to the invention are the relevant conventional ones of the formula stated above; they are sufficiently well known from the literature and in practice and therefore need not be described further. Typical examles of outstanding members of this group are triethylaluminum, triisobutylaluminum, tri-n-butyl- aluminum, tri-n-hexylaluminum and tri-n-octylaluminum.

Finally, it may also be stated that the novel titanium-containing catalyst components (1), ie. the products (VI), are sensitive to hydrolytic and oxidative influences. Thus, when these substances are handled, the relevant conventional precautions for Ziegler catalysts should be taken (eg. exclusion of moisture, inert gas atmosphere).

EXAMPLE

Preparation Of The Titanium-Containing Catalyst Component (1)

(1.1.) First, in a first stage, a procedure is adopted in which (1.1.1) a finely divided, porous, inorganic oxide substance (I) which has a particle diameter of from 20 to 45 μm, a pore volume of 1.7 cm³/g and a surface area of 300 m²/g and is of the formula $SiO_2$, and (1.1.2) a solution (II), as obtained by combining (IIa) 100 parts by weight of acetone,
(IIb) 0.24 part by weight (calculated as titanium) of a titanium trichloride of the formula $TiCl_3 \cdot nAlCl_3$, where n is 0.33,
(IIc) 0.45 part by weight (calculated as magnesium) of a magnesium chloride ($MgCl_2$) and
(IId) 2 parts by weight of a low molecular weight polymeric compound which has a viscosity of 30 Pas (polyisobutylene) and contains the repeating structural unit

where $R^{10}$ and $R^{11}$ are each methyl and X is methylene, are brought into contact with one another for one hour at 40° C. while stirring, with formation of a dispersion (III), with the proviso that the weight ratio of the inorganic oxide substance (I) to titanium in the titanium trichloride (IIb) is 1:0.012 and the weight ratio of the inorganic oxide substance (I) to magnesium in the magnesium chloride (IIc) is 1:0.022, and the dispersion (III) is evaporated to dryness by means of a stream of nitrogen at an operating temperature of 70° C., with formation of a solid-phase intermediate (IV).

This intermediate (IV) contains 0.9% by weight of titanium.

(1.2) Then, in a second stage, a procedure is adopted in which (1.2.1) 100 parts by weight of the solid-phase intermediate (IV) obtained from stage (1.1) and (1.2.2) an aluminum component (V) which is dissolved in 280 parts by weight of n-heptane and consists of (1.2.2.1) 50 mol % of a complex (soluble in the n-heptane) of the empirical formula

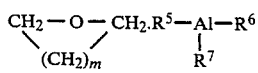

where m is 2, $R^5$ and $R^6$ are each ethyl and $R^7$ is chlorine, and (1.2.2.2) 50 mol % of an aluminum compound (soluble in the n-heptane) of the formula

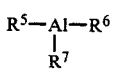

where $R^5$ and $R^6$ are each ethyl and $R^7$ is chlorine, are brought into contact with one another for two hours at 50° C. while stirring, with formation of a dispersion, with the proviso that the atomic ratio of titanium in the solid-phase intermediate (IV) to aluminum in the aluminum component (V) is 1:26; the solid-phase product (VI) obtained as a dispersion is the titanium-containing catalyst component (1).

The latter is isolated by filtration under suction, washed several times with n-heptane and dried; it contains 0.6% by weight of titanium and 12.6% by weight of chlorine.

Polymerization using the catalyst component (1) described above.

The polymerization is carried out continuously in a cylindrical fluidized bed reactor which has a diameter of 50 cm and is filled with 160 kg of a finely divided polymer as a polymerization medium during the polymerization in the continuous steady state.

Specifically, the polymerization process is as follows:

(a) The polymerization medium is a fluidized bed of finely divided polymer with the provisos that ($a_1$) fluidization of the polymerization medium is effected with a gas stream which is directed upward and whose velocity is 35 cm/s;

($a_2$) in the polymerization medium, the heat of polymerization is essentially removed by the gas stream required to maintain the fluidized bed;

(b) the monomers consumed by polymerization and the hydrogen used to regulate the molecular weight of the polymer are supplemented continuously;

(c) the selected conditions, such as pressure, temperature and gas composition, are kept constant;

(d) the polymerization is carried out under a total pressure of 20 bar at 85° C. and with an $H_2$:ethene ratio of 0.15:1 and a but-1-ene:ethene ratio of 0.4:1.

Under these conditions, and with an intermittent feed of 6.7 g/hour of the catalyst component (1) described above and 5.8 g/hour of triisobutylaluminum as catalyst component (2) (=a Ti:Al atomic ratio of 1:3), ethene is copolymerized with but-1-ene.

Further data on the resulting polymer are given in the Table below.

COMPARATIVE EXPERIMENT 1

Preparation Of The Titanium-Containing Catalyst Component (1)

The procedure described in Example 1 is followed, the only two exceptions being that in the first stage (1.1) under (1.1.2), for the solution (II), (i) methanol is used as the organic, oxygen-containing solvent (IIa) and (ii) the low molecular weight polymeric compound (IId) is dispensed with.

The catalyst compound thus obtained contains 1.5 parts by weight of titanium and 19.5 parts by weight of chlorine.

Polymerization using the catalyst component (1) described above.

The polymerization is carried out as in the Example, except that the catalyst component (1) described there is replaced with the same amount (calculated as titanium) of the catalyst component (1) described here.

The result is likewise shown in the Table below.

COMPARATIVE EXPERIMENT 2

Preparation Of The Titanium-Containing Catalyst Component (1)

The preparation is carried out according to European Laid-Open Application No. 0,004,647, Example 1, with the proviso that (i) the inorganic oxide substance (I) used is the same as that employed in the novel Example described above and (ii) the solvent used is not tetrahydrofuran but acetone.

The catalyst component obtained contains 0.8% by weight of titanium and 5.9% by weight of chlorine.

Polymerization using the catalyst component (1) described above.

The polymerization is carried out as in the Example, except that the catalyst component (1) described there is replaced with the same amount (calculated as titanium) of the catalyst component (1) described here.

The result is once again shown in the Table below.

TABLE

| | Productivity[1] | Bulk density[2] | Melt flow index[3] | Density[4] | Soluble components[5] | Fine particles[6] |
|---|---|---|---|---|---|---|
| Example | $8.6 \cdot 10^5$ | 420 | 1.0 | 0.919 | 0.1 | <0.05 |
| Comparative Experiment 1 | $8.7 \cdot 10^5$ | 240 | 1.0 | 0.920 | 0.7 | >30 |
| Comparative Experiment 2 | $3.9 \cdot 10^5$ | 330 | 1.0 | 0.919 | 2.5 | 10–15 |

[1] In g of polymer per g of titanium in the catalyst component (1)
[2] In g/cm$^3$ according to DIN 53,468
[3] MFI 190/2.16 in g/10 min according to DIN 53,735
[4] In g/cm$^3$ according to DIN 53,479
[5] In % of the polymer with 1 g of polymer in 5 g of n-heptane at 20° C. in the course of 2 hours
[6] Amount of fine particles (smaller than 0.1 mm) discharged from the reactor during polymerization, in g per kg of polymer per hour.

We claim:

1. A process for the preparation of homopolymers and copolymers of ethylene with minor amounts of $C_3$–$C_8$-alpha-monoolefins, which comprise polymerizing of the monomer or monomers at from 30° to 200° C. and under from 1 to 200 bar by means of a Ziegler catalyst system consisting of
   (1) a titanium-contianing catalyst component and
   (2) an aluminum-containing catalyst component of the formula $AlR_3$, where R is a $C_1$–$C_{12}$-hydrocarbon radical, with the provisos that (i) the atomic ratio of titanium in the catalyst component (1) to aluminum from the catalyst component (2) is from 1:5 to 1:700, and (ii) the titanium-containing catalyst component (1) employed is the solid-phase product (VI) which is obtained when
   (1.1) first
      (1.1.1) a finely divided, porous, inorganic oxide substance (I) which has a particle diameter of from 1 to 1000 μm, a pore volume of from 0.3 to 3 cm$^3$/g and a surface area of from 100 to 1000 m$^2$/g and is of the formula $SiO_2 \cdot aAl_2O_3$, where a is from 0 to 2, and
      (1.1.2) a solution (II) as obtained by combining
         (IIa) 100 parts by weight of an organic oxygen-containing solvent.
         (IIb) from 0.01 to 6 parts by weight (calculated as titanium) of a titanium trichloride of the formula $TiCl_3 \cdot nAlCl_3$, where n is from 0 to 0.5, and
         (IIc) from 0.01 to 4 parts by weight (calculated as magnesium) of magnesium chloride ($MgCl_2$), are brought into contact with one another with formation of a dispersion (III), with the proviso that the weight ratio of inorganic oxide substance (I) to titanium in the titanium trichloride (IIb) is from 1:0.01 to 1:0.2 and the weight ratio of inorganic oxide substance (I) to magnesium in the magnesium chloride (IIc) is from 1:0.01 to 1:0.25, the dispersion (III) is evaporated to dryness at below 200° C. and above the melting point of the organic oxygen-containing solvent (IIa) used, with formation of a solid-phase intermediate (IV), and
   (1.2) then
      (1.2.1) the solid-phase intermediate (IV) obtained from stage (1.1) and
      (1.2.2) an aluminum component (V) which is dissolved in an inert hydrocarbon and consists of
         (1.2.2.1) from 25 to 100 mol % of a complex which is soluble in the inert hydrocarbon and is of the empirical formula

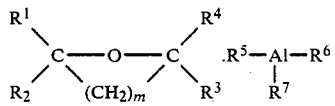

where m is 2, 3 or 4, $R^1$, $R^2$, $R^3$ and $R^4$ are each $C_1C_3$-alkyl or hydrogen, $R^5$ and $R^6$ are each a $C_1$–$C_{12}$-hydrocarbon radical and $R^7$ is a $C_1$–$C_{12}$-hydrocarbon radical or chlorine, and
         (1.2.2.2) from 0 to 75 mol % of an aluminum compound which is soluble in the inert hydrocarbon and is of the formula

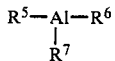

where $R^5$ and $R^6$ are each a $C_1$–$C_{12}$-hydrocarbon radical, and $R^7$ is a $C_1$–$C_{12}$-hydrocarbon radical or chlorine are brought into contact with one another with formation of a dispersion, with the provisos that (i) the sum of the molar percentages under (1.2.2.1) and (1.2.2.2) is 100 and (ii) the atomic ratio of titanium in the solid-phase intermediate (IV) to aluminum in the aluminum component (V) is from 1:1 to 1:50, the resulting dispersed solid-phase product (VI) being the titanium-containing catalyst component (1), wherein the titanium-containing catalyst component (1) employed is prepared using, in stage (1.1) under (1.1.2), a solution (II) which contains
      (IIa) a ketone of the formula

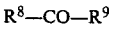

where $R^8$ and $R^9$ are each a saturated $C_1$–$C_8$-hydrocarbon radical, as the organic oxygen-containing solvent, and additionally contains
      (IId) from 0.01 to 10 parts by weight of a low molecular weight polymeric compound which has a viscosity of from $10^{-3}$ to $10^3$ Pas and has repeating structural units

where $R^{10}$ and $R^{11}$ are each methyl and X is methylene.

* * * * *